Patented Sept. 14, 1948

2,449,332

UNITED STATES PATENT OFFICE 2,449,332

S-(AMIDOMETHYL)-DIMERCAPTO-PROPANOLS

Frank K. Signaigo, Brandywine Hundred, Del., assignor, by mesne assignments, to the United States of America as represented by the Secretary of War No Drawing. Application March 6, 1945, Serial No. 581,322

4 Claims. (Cl. 260—561)

This invention relates to organic sulfides and their preparation. For convenience and simplicity, they are referred to herein as S-ethers of certain compounds having mercapto groups.

It has recently been found that the compound 2,3-dimercaptopropanol is useful in arsenic therapy, particularly against such substances as the chlorovinylchloroarsines. The usefulness of this compound in aqueous media, however, is limited because of its relatively low water-solubility and because of the instability of the aqueous solutions.

An object of the present invention is to provide derivatives of 2,3-dimercaptopropanol which are useful as systemic anti-arsenicals and as anti-vesicants. Another object is to provide derivatives of 2,3-dimercaptopropanol which are more soluble in and more stable towards water than that compound. A more specific object is to prepare derivatives of 2,3-dimercaptopropanol in which mercapto hydrogen is replaced by radicals having hydrocarbon amide groups. Other objects will appear hereinafter.

These objects are accomplished by the invention of S-amido-methyl ethers of 2,3-dimercaptopropanol and the processes for preparing them which are described below. These S-ethers are derivatives of 2,3-dimercaptopropanol in which at least one of the mercapto hydrogens is replaced by the group

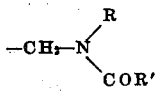

wherein R is hydrogen or a hydrocarbon radical and R' is a hydrocarbon radical.

In accordance with one method for preparing the S-amido-methyl ethers of this invention, a carboxylic acid amide having hydrogen on the amido nitrogen atom is reacted with formaldehyde and 2,3-dimercaptopropanol. This method is represented by the following equation:

$2CH_3CONH_2 + 2HCHO + HSCH_2CH(SH)CH_2OH \longrightarrow$

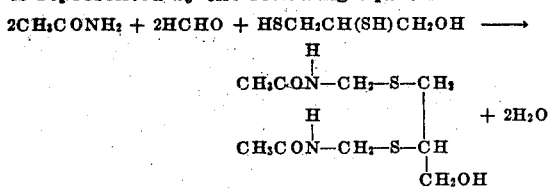

In a modification of the reaction illustrated above, an N-hydroxymethylcarboxylic acid amide is first prepared by reacting a carboxylic acid amide with formaldehyde, and the isolated N-hydroxymethyl amide then reacted with 2,3-dimercaptopropanol. This method is illustrated by the following equation:

$2CH_3CONHCH_2OH + HSCH_2CH(SH)CH_2OH \longrightarrow$

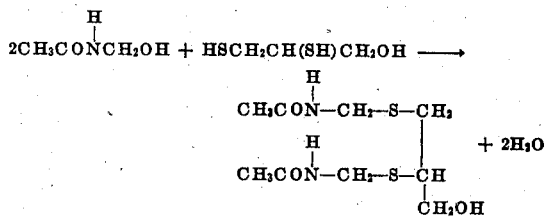

In accordance with still another method, which is convenient for the preparation of an anhydrous product, an N-(alkoxymethyl) carbonamide is reacted in the presence of an acid catalyst with 2,3-dimercaptopropanol. This method is illustrated by the following equation:

$2CH_3CONHCH_2OCH_3 + HSCH_2CH(SH)CH_2OH \longrightarrow$

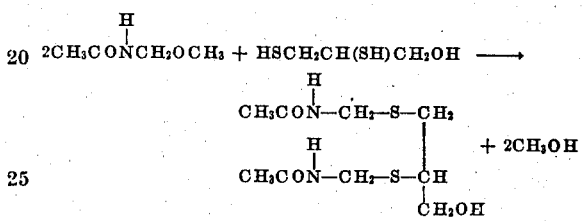

In each of these methods, thio-ethers in which only one mercapto hydrogen is replaced by an amidomethyl radical can be obtained by employing equimolar proportions of the reactants.

The invention is illustrated in greater detail by the following examples, in which the proportions of the ingredients are expressed as parts by weight:

Example I

To a mixture of 43.5 parts of N-ethylacetamide and 40.5 parts of 37% aqueous formaldehyde is added 31 parts of 2,3-dimercaptopropanol. The mixture becomes warm immediately due to the heat of reaction, goes to a clear solution and remains warm for 30 to 50 minutes. After the reaction product has cooled to room temperature, titration of a sample dissolved in anhydrous ethanol with standard iodine indicates that the reaction is substantially complete, 93% of the original thiol groups having disappeared. The resulting bis-S-(N-ethylacetamidomethyl) ether of 2,3-dimercaptopropanol can be isolated if desired, but it is preferably employed as the clear aqueous solution resulting from the reaction.

Example II

To a solution of 27 parts of acetamide in 37 parts of 37% aqueous formaldehyde is added 58 parts of 2,3-dimercaptopropanol. The mixture, which warms up due to the heat of reaction, is allowed to stand at room temperature for three hours. Titration of a sample of this reaction mixture dissolved in ethanol with standard iodine solution indicates that between ¼ and ½ of the original thiol groups have been converted to thioether groups. Continuation of the reaction overnight increases to some extent the conversion of the thiol groups. The resulting mono-S-acetamidomethyl ether of 2,3-dimercaptopropanol is a clear viscous oil which is miscible with water.

*Example III*

To a mixture of 8.1 parts of 37% aqueous formaldehyde and 5.9 parts of acetamide is added 6.2 parts of 2,3-dimercaptopropanol. The mixture warms up and a homogeneous solution results in a few minutes. After the reaction mixture has stood overnight at room temperature, titration of a sample with standard iodine solution indicates 87% of the thiol groups have reacted. Another 2.0 parts of 37% aqueous formaldehyde is added and, after 3 more hours reaction at room temperature, titration indicates 91% of the thiol groups have reacted. The resulting bis-S-(acetamidomethyl) ether of 2,3-dimercaptopropanol is miscible with water.

*Example IV*

Seventy (70) parts of benzamide, 70 parts of water and 48 parts of 37% aqueous formaldehyde are mixed with 2 parts of potassium carbonate as a catalyst and the reaction mixture allowed to stand at room temperature. In a few minutes N-methylolbenzamide begins to crystallize out, a 90% yield of the product having a melting point 92–95° C. being obtained. A mixture of 60.4 parts of this material with 25 parts of 2,3-dimercaptopropanol in 82 parts of ethyl alcohol is warmed until a clear solution is formed. Into this solution is then passed sufficient dry hydrogen chloride to produce an acid reaction medium. After standing at about 25° C. for about 15 hours, the mixture is warmed to 50–55° C. for thirty minutes and another 2.0 parts of N-methylolbenzamide added. After standing again for 15 hours at 25° C. it is then poured into 400 parts of ice water and extracted with 150 parts of chloroform. The chloroform extract is dried with anhydrous calcium sulfate and the chloroform removed under reduced pressure. The residual material is the bis-S-(benzamidomethyl) ether of 2,3-dimercaptopropanol, having on analysis a nitrogen content of 6.9% as compared to the calculated amount of 7.2%.

*Example V*

A mixture of 40 parts of N-methylacetamide, 16.5 parts of paraformaldehyde and 0.2 part of sodium hydroxide is heated on a steam bath until the paraformaldehyde dissolves, this requiring about 30 minutes. The resulting solution is added to 119 parts of methanol, the mixture then being cooled to 0° C. and saturated with dry hydrogen chloride. After standing about 15 hours at 25° C., it is made neutral to "Brilliant Yellow" paper with a methanol solution of sodium methoxide, the sodium chloride which forms filtered off, and the solvent then removed by distillation. The residue is distilled in vacuo, N-methoxymethyl-N-methylacetamide being obtained. This intermediate product has a B.P/1 mm. of 45–50° C. and an index of refraction $n_D^{25}$ 1.4348. To a mixture of 11.7 parts of N-methoxymethyl-N-methylacetamide and 6.2 parts of 2,3-dimercaptopropanol in 40 parts of methanol, dry hydrogen chloride is added until 2 parts are absorbed. The resulting solution is warmed to about 50° C. for a few minutes and then allowed to stand at about 25° C. for 12 to 15 hours. Titration of a sample of the reaction mixture indicates that about one-fourth of the thiol groups have not yet reacted. Another 3.0 parts of N-methoxymethyl-N-methylacetamide is added and the mixture warmed to 50° C. for about 30 minutes. Titration of a sample of the reaction mixture indicates substantially complete reaction of the thiol groups. The hydrogen chloride in the mixture is neutralized with sodium methoxide and about half of the solvent removed by evaporation, whereupon sodium chloride precipitates. This salt is removed by filtration and the remainder of the solvent removed by evaporation leaving the compound, bis-S-(N-methylacetamidomethyl) ether of 2,3-dimercaptopropanol as a clear syrup.

So far as is known, any hydrocarbon primary or secondary amide, i. e., one having amido hydrogen, may be employed in the processes stated and illustrated above for preparing the S-amidomethyl ethers of the present invention. Thus, by appropriate choice of the amide, thio-ethers may be obtained in which the radicals R and R' of the group

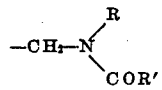

which is attached in the final products to one or both of the S-atoms of the 2,3-dimercaptopropanol, are aliphatic, alicyclic, or aromatic, long or short chain, or saturated or unsaturated, hydrocarbon radicals.

In the process illustrated by Examples I to III, the reaction conditions employed are not critical and may be varied over wide limits. Since the reaction between the amide, formaldehyde, and 2,3-dimercaptopropanol takes place with the evolution of heat, it is not necessary to apply external heat; however the rate of reaction may be increased by warming in the later stages to from 50° to 100° C. Stoichiometric quantities of reactants are preferred since an excess of either reactant is not easily removed from the reaction product; however an excess of either reactant may be used if complete consumption of the other is desired. Aqueous formaldehyde is preferred to paraformaldehyde since the latter tends to react with the 2,3-dimercaptopropanol to give polymeric byproducts, thus lowering the yield of the desired thio-ether. The reaction medium may comprise, in addition to water, alcohols such as methanol or propanol, this being particularly desirable when a high molecular weight amide is being reacted.

The S-amidomethyl ethers of 2,3-dimercaptopropanol need not be isolated from the reaction mixture for use in various applications, such as in therapeutic ointments, where they are employed in aqueous or water soluble compositions. However, if it is desired to remove the small amount of water introduced with the aqueous formaldehyde this can be done by warming the reaction mixture under reduced pressure.

In the processes illustrated by Examples IV and V, involving the reaction of the hydroxymethylamide or alkoxymethylamide with 2,3-dimercaptopropanol, an acid catalyst such as hydrogen chloride is used. In these processes, it is also preferred to warm the reaction mixture, e. g., to from 50°–100° C. and to use an excess, e. g., 25%, of the amide in the reaction mixture. The process illustrated by Example V is preferred when anhydrous S-amidomethyl ethers of 2,3-dimercaptopropanol are desired.

The S-amidomethyl ethers of 2,3-dimercaptopropanol have a number of properties which make them of particular value for therapeutic applications. In comparison to 2,3-dimercaptopropanol, the S-amidomethyl ether group increases the solubility in water and protects the thiol group from decomposition, the compound still possessing the desired therapeutic and chemical reactivity. For example, an 18.5% aqueous solution of the product of Example I can be heated at 100° C. for 1 hour without decomposition, whereas aqueous solutions of 2,3-dimercaptopropanol decompose in a few hours at room temperature. Moreover the aqueous solutions of the S-amidomethyl ethers can be adjusted to a pH ranging from mildly alkaline to mildly acid without destroying this stability. The higher solubility of the S-amidomethyl ethers, compared to that of 2,3-dimercaptopropanol, enables the thio-ethers to be incorporated in desired concentrations in water-soluble ointments for use in arsenic therapy. The S-amidomethyl ethers of 2,3-dimercaptopropanol are soluble in alcohols, e. g., methanol, ethanol, ethylene glycol and propylene glycol, but are insoluble in hydrocarbon solvents. The S-amidomethyl ethers having hydrogen or low molecular weight hydrocarbon radicals on the nitrogen atom are water soluble. The thio-ethers having hydrocarbon radicals on the nitrogen atom are also soluble in ethyl ether.

Having thus described my invention, what I claim as new and wish to secure by Letters Patent is:

1. A stable, water soluble anti-vesicant compound useful as an anti-vesicant and in arsenic and cadmium therapy conisting of a derivative of 2,3-dimercaptopropanol in which at least one mercapto hydrogen is replaced by the group.

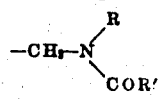

wherein R is a radical selected from the group consisting of hydrogen and a hydrocarbon radical, and R' is a hydrocarbon radical.

2. A stable, water soluble anti-vesicant compound useful as an anti-vesicant and in arsenic and cadmium therapy consisting essentially of bis-S-(N-ethylacetamidomethyl) ether of 2,3-dimercaptopropanol.

3. A stable, water soluble anti-vesicant compound useful as an anti-vesicant and in arsenic and cadmium therapy consisting essentially of mono-S-(acetamidomethyl) ether of 2,3-dimercaptopropanol.

4. A stable, water soluble anti-vesicant compound useful as an anti-vesicant and in arsenic and cadmium therapy consisting essentially of bis-S-(acetamidomethyl) ether of 2,3-dimercaptopropanol:

FRANK K. SIGNAIGO.

REFERENCES CITED

The following references are of record in the file of this patent:

UNITED STATES PATENTS

| Number | Name | Date |
|---|---|---|
| 2,323,111 | Austin | June 29, 1943 |
| 2,337,220 | Albrecht | Dec. 21, 1943 |
| 2,423,797 | Peters et al. | Dec. 16, 1947 |